No. 760,222. PATENTED MAY 17, 1904.
G. W. LOVEJOY.
WHEEL.
APPLICATION FILED MAY 6, 1903.
NO MODEL.

Witnesses
Percy C. Bowen.
M. E. Moore.

Inventor
George W. Lovejoy
by
Attorney

No. 760,222.

Patented May 17, 1904.

UNITED STATES PATENT OFFICE.

GEORGE W. LOVEJOY, OF TEHACHAPI, CALIFORNIA, ASSIGNOR OF ONE-HALF TO JOHN P. CUDDIBACK, OF TEHACHAPI, CALIFORNIA.

WHEEL.

SPECIFICATION forming part of Letters Patent No. 760,222, dated May 17, 1904.

Application filed May 6, 1903. Serial No. 155,850. (No model.)

*To all whom it may concern:*

Be it known that I, GEORGE W. LOVEJOY, a citizen of the United States, residing at Tehachapi, in the county of Kern and State of California, have invented certain new and useful Improvements in Wheels, of which the following is a specification.

My invention relates to improvements in wheels, and refers particularly to a wheel for use upon plows to be attached to the beam of the plow.

The object of my invention is the provision of a wheel which can be manufactured at a comparatively low price, which will be strong and durable, and thoroughly efficient and practical in every particular.

With this object in view my invention consists of a wheel embodying novel features of construction and combination of parts substantially as disclosed herein.

Figure 1:
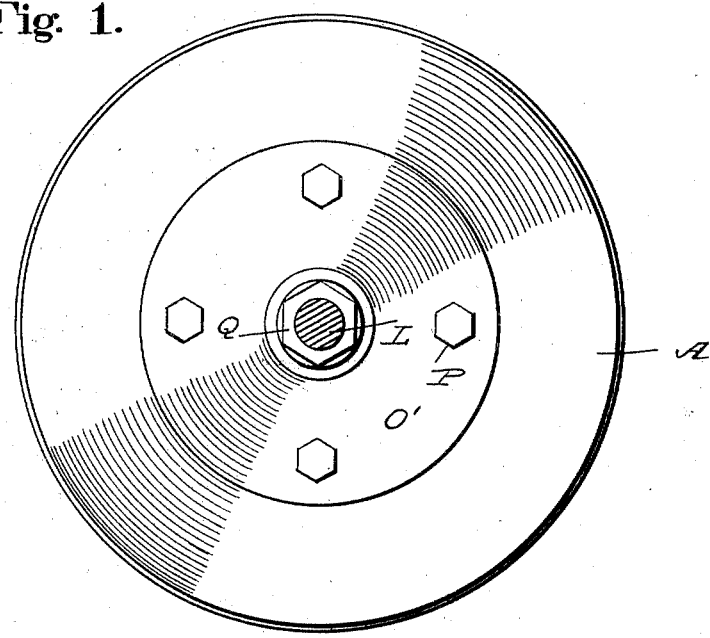
Figure 2:
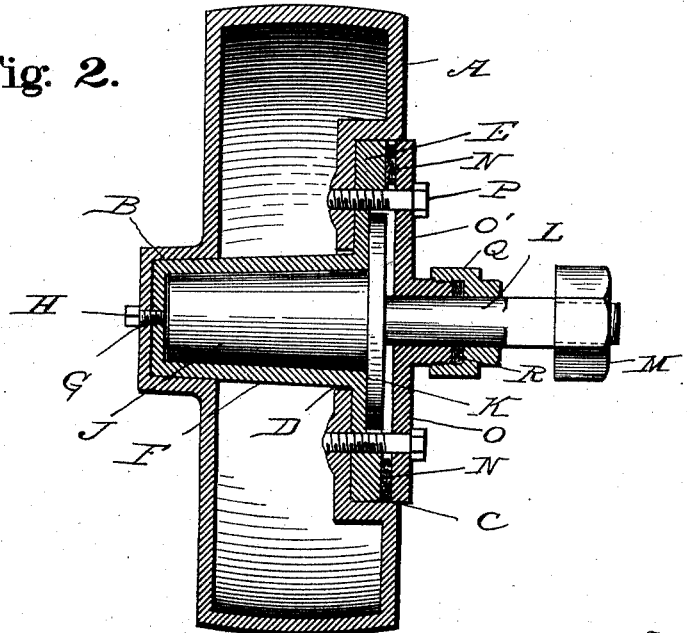

Figure 1 represents an elevation of my wheel with the box and axle in place, and Fig. 2 is a central sectional view of the complete wheel.

Referring by letter to the drawings, the letter A designates the wheel proper, which is preferably cast hollow and provided on one side with the extension forming a cup B and on the opposite side with the recess or channel C, having an opening D in line with the said cup of the wheel. This much of the wheel is preferably made in one casting, and fitting in the recess or channel is the annular flange E, formed on the conical box F, the inner end of which fits in the cup of the wheel, and in the walls of the cup and box is provided an opening G, which forms a means for supplying oil to the interior of the box for oiling the axle, said oil-passage having a screw cap or cover H. Fitting and journaled in the box is the tapering or conical axle J, provided with the annular flange K and with the stem L, which projects beyond the axle and forms the means of connecting the axle by means of the said stem and the securing-nut M to the implement.

Resting against the flange of the box is the packing or washer N, against which also rests the plate O, the whole being secured in place to the wheel by the series of screws P, and the plate is provided with a rim O', which has exterior screw-threads to receive the screw-cap Q, between which and said rim is interposed a packing or gland R.

From this construction it will be seen that I provide a wheel which can be cast in one piece, making it very cheap, which compactly receives the working parts, which can be easily oiled, and which will run a long time without reoiling, and which is absolutely dust-proof, also that the axle runs at all times and at all parts in the oil.

I claim—

1. The herein-described wheel made hollow or in the form of a drum, one of the vertical walls of the wheel being formed with an extension provided with an oil-inlet, a closure for controlling said inlet, the other vertical wall being provided with an opening in line with the extension of the other wall and an annular depression or recess around said opening, a sleeve fitting in the hollow extension at one end and having the flange fitting said annular recess of the other wall, said sleeve having an oil-inlet controlled by the closure, the axle fitting in the sleeve and having the collar resting against the annular flange of the sleeve, the stem formed on the axle carrying the fastening-nut, the cap-plate mounted on the stem, the fastenings connecting the cap-plate, flange of the sleeve, and the recessed wall of the wheel and the nut on the stem connected with the cap-plate.

2. The herein-described wheel made hollow or in the form of a drum, having one of its vertical walls provided with a hollow extension and having the other vertical wall formed with an opening surrounded by an annular depression or recess, a sleeve fitting in the hollow extension and having a flange seated in the annular recess, means for supplying oil to the sleeve for lubricating the axle, the axle fitted in the sleeve and formed with an annular collar and a reduced stem, and a cap-plate for securing the sleeve but permitting revolution of the axle.

In testimony whereof I affix my signature in presence of two witnesses.

GEORGE W. LOVEJOY.

Witnesses:
G. T. VAN VOORHEES,
JOHN W. FLETCHER.